Inventor
Karl-Werner Kanngiesser
By Pierce, Scheffler & Parker
Attorneys

United States Patent Office 3,319,151
Patented May 9, 1967

3,319,151
CONTROL ARRANGEMENT FOR SELF-GUIDED INVERTERS
Karl-Werner Kanngiesser, Viernheim, Hesse, Germany, assignor to Aktiengesellschaft Brown, Boveri & Cie., Baden, Switzerland, a joint-stock company
Filed Sept. 25, 1964, Ser. No. 399,273
Claims priority, application Germany, Oct. 5, 1963, B 73,774
3 Claims. (Cl. 321—27)

The present invention relates to electrical inverters for converting a source of direct current into an alternating current of a particularly desired frequency, and more particularly to an improved arrangement for producing series of control pulses which are used to operate one inverter or two or more interconnected inverters having their outputs connected in series.

In low-power, self-guided and self-controlled inverters, it is desirable to keep the expenditure for the control device necessary to control the inverter valves as low as possible. Such a control device usually consists of a self-excited impulse-transmitter to produce the impulses of the desired frequency and in the desired number, also if necessary a phase shifting device to vary the start of ignition of the valves, and frequency also an additional device for producing the suitable impulse forms. Other parts of the circuit arrangement serve to effect the potential separation of the control impulses fed to the valves and to add their proper bias voltage.

The general object of the present invention is to provide a control device for self-guided inverters with an especially small cost for the circuit.

It has already been suggested to design an impulse transmitter for converters, particularly for multi-pulse inverters, which require $3n$ symmetrically dephased impulse series of the frequency $f$, where $n$ represents an even number ($n=2, 4 \ldots$) in such a way that an A.-C. voltage, which has half the frequency of $3nf$, is connected to a saturation transformer with a secondary winding with center tap, and that two impulse series with 180° phase displacement are derived from the secondary partial voltages over differently poled diodes, which are fed to a counting ring consisting of $3n$ members. The members of this counting ring are brought alternately into different functional positions by the two above-mentioned impulse series, so that a corresponding number of impulses are emitted by these members.

In another suggested control device for multiple-pulse converters where an impulse transmitter with a single-phase A.-C. voltage is provided for each valve branch of the converter as an output voltage, a condenser is periodically recharged by means of a rectangular alternating current produced by this A.-C. voltage, and a rectangular impulse is derived from a voltage section of the triangular condenser voltage connected in series with the variable D.-C. voltage. This impulse, whose frequency is identical with the frequency of the A.-C. voltage, can be varied in phase by varying the D.-C. voltage in the manner of a so-called vertical control.

The present invention relates to a control device for self-guided inverters with the pulse number $p$ for producing $m$ A.-C. voltages of the frequency $f$ with $p/m=1, 2 \ldots$, where a self-excited impulse transmitter acting as a sawtooth generator, a frequency divider and other relating circuit components are used.

The invention provides that short impulses of the frequency $p \cdot f$ are derived from the zero passages of the output voltage of a sawtooth generator tuned to the same frequency and connected in series opposition with a variable D.-C. voltage, in combination with a pulse shaper, these impulses serving as input signals to a frequency divider with $p$ outputs, whose division ratio is $1:p$, and acting so that $p$ symmetrically dephased impulse series of the frequency $f$ appear as output signals of the frequency divider, which are then transformed into potential-separated control impulses provided with the necessary bias voltage for the control of the valves of the inverter.

The inventive concept can be incorporated in various embodiments and these are depicted in the attached drawings and will be described in detail. In these embodiments the control is for a self-guided two-pulse inverter so that $p=2$.

Figure 1:
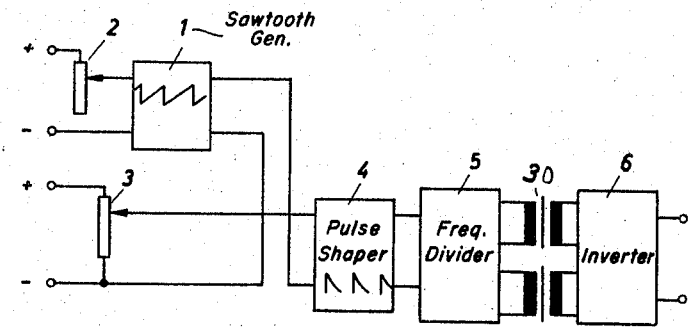
FIG. 1 illustrates one embodiment of the invention in block schematic of a two-pulse inverter with two emitted control impulse series. Since the inverter gives off a single-phase A.C. voltage, $m=1$.
Figure 2:
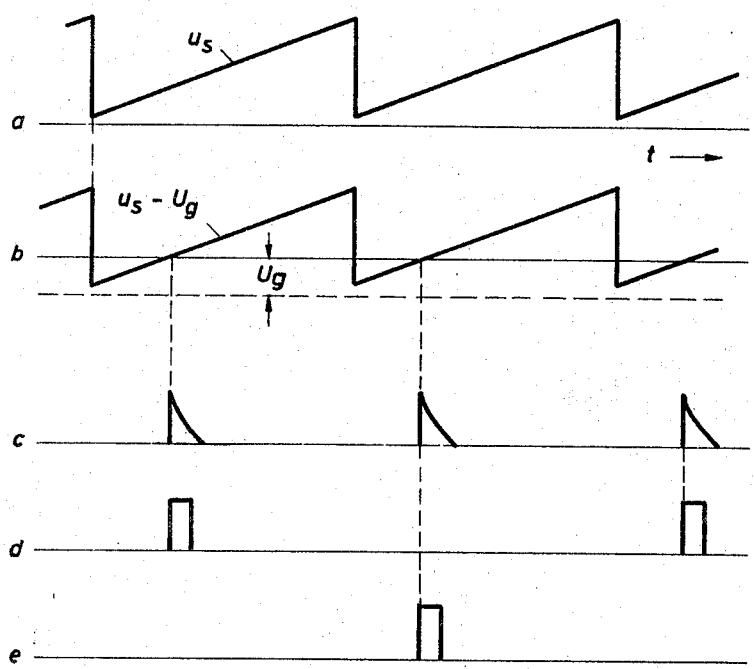
FIG. 2 is a graph showing the various voltage processes involved in operation of the circuit of FIG. 1.
Figure 6:
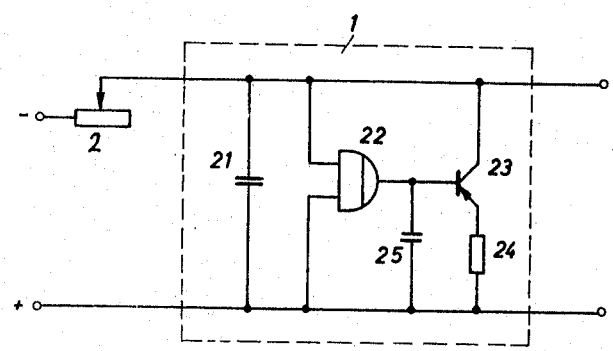
FIG. 6 illustrates the circuit for one suitable type of self-controlled sawtooth voltage generator which serves as a component of the novel control circuit.

With reference now to the drawings and to FIG. 1 in particular, the sawtooth generator for producing a voltage wave having a sawtooth form is indicated by the block 1. One suitable circuit arrangement for this generator is illustrated in FIG. 6 and will be later described in more detail. In general, it comprises a condenser with a discharge circuit therefor controlled in dependence upon the voltage, which effects a periodic discharge of the condenser. The related periodic charge of the condenser, whose duration determines the cycle of the sawtooth voltage appearing on the condenser is effected over a variable charging resistance 2 by means of a D.-C. voltage source represented only symbolically. The sawtooth voltage is represented in FIG. 2 by curve $a$ as a function of the time $t$. The cycle is so selected that its reciprocal value, that is, its frequency, yields the double frequency $2f$ of the desired frequency $f$ of the A.-C. voltage of the inverter.

The sawtooth voltage, designated with $u_s$, which appears as the output voltage of the generator 1, is connected in series opposition with a D.-C. voltage $U_g$, which can be varied by means of a potentiometer 3. The resulting differential voltage $u_s - U_g$ is represented in FIG. 2 by curve $b$.

Short impulses of the frequency $2f$ are derived from the zero passage points of the differential voltage $u_s - U_g$ by means of a circuit component 4 known as a pulse shaper. This pulse shaper can consist, for example, of an arrangement of a transformer-like device with two windings and with a core with a rectangular magnetizing loop, whose primary winding is connected over a limiting resistance to the above mentioned differential voltage. The pulse shaper can also be designated as a transistorized flip-flop circuit, known as a Schmitt trigger, which has two different switching states for two different values of the input voltage.

Figure 7:
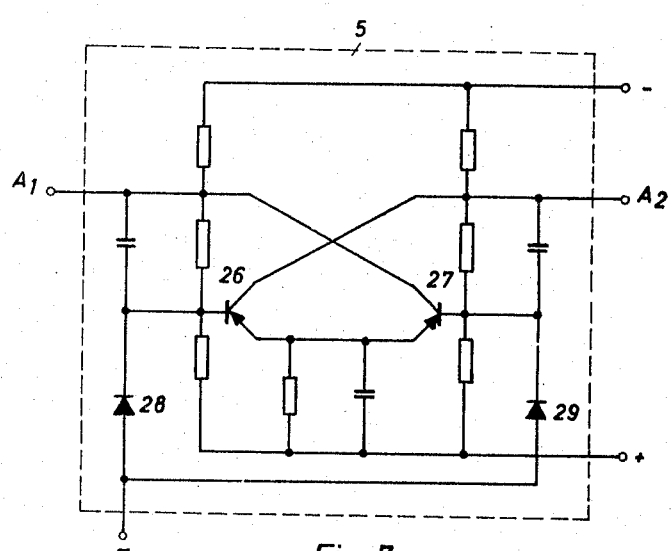
FIG. 7 illustrates the circuit for one suitable type of frequency divider which also serves as a component of the novel control circuit.

The impulses of the frequency $2f$, emitted by the impulse transmitter 4, and shown in curve $c$ of FIG. 2, are fed to a frequency divider 5, which serves to transform the impulse series of the frequency $2f$ into two symmetrically dephased impulse series of the frequency $f$. This frequency divider can be designed in the manner of the divider stages of the impulse generators for the synchronizing impulses in television engineering, or as a counting ring with bistable flip-flop circuits. A circuit diagram of such an arrangement is shown in FIG. 7 and will be described later in further detail. The impulses emitted by the frequency divider are represented by the curves $d$ and $e$ in FIG. 2.

The two impulse series thus formed are now fed to the inverter 6, with the interposition of two transmission units 30, which are designed as isolating transformers with a core and with rectangular magnetizing loops, after adding the bias voltage necessary for the control of the valves. The two-pulse inverter is designed, for example, in center tap arrangement. The A.-C. voltage produced is fed to the indicated output terminals T.

In a similar manner, control devices can be designed for multiple-pulse and multiple-phase inverters. In a six-pulse inverter for producing a three phase A.-C. voltage, $p=6$ and $m=3$. For example, the sawtooth generator must produce here an impulse series of the frequency $6f$, which is divided by the frequency divider into six impulse series of the frequency $f$. The transformation of the six phases of the valve branches into the three phases of the output A.-C. voltages is effected on the basis of the winding structure of the transformer.

The control device for a two-pulse inverter represented in FIG. 1 offers, in a simple way, the possibility of combining two identical inverters by connecting their output A.-C. voltages in series, the inverters being controlled in slight phase displacement to eliminate certain harmonics of the A.-C. voltages, for example, the third harmonic. In inverters which produce a rectangular output voltage, the third harmonic is very pronounced. It can be suppressed, as known, by connecting in series the output side of two inverters whose A.-C. voltages have a phase displacement of 60 degrees.

Figure 3:
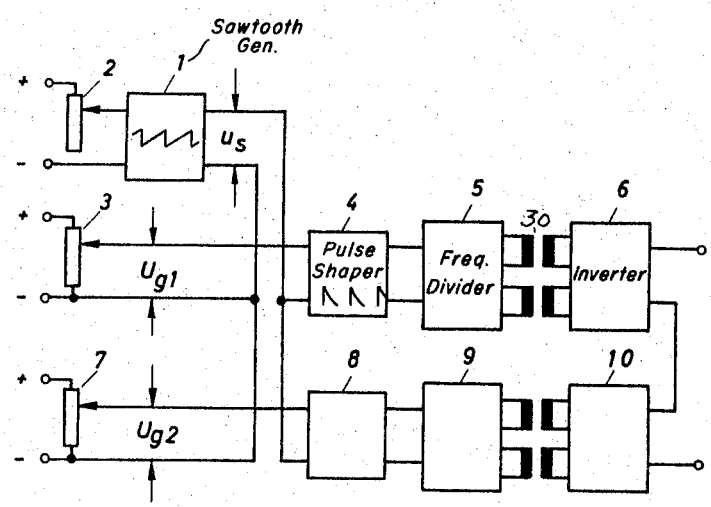
FIG. 3 is also a block schematic diagram of another embodiment of the invention which comprises a pair of the two-pulse inverters illustrated in FIG. 1 and which have their outputs connected in series.
Figure 4:
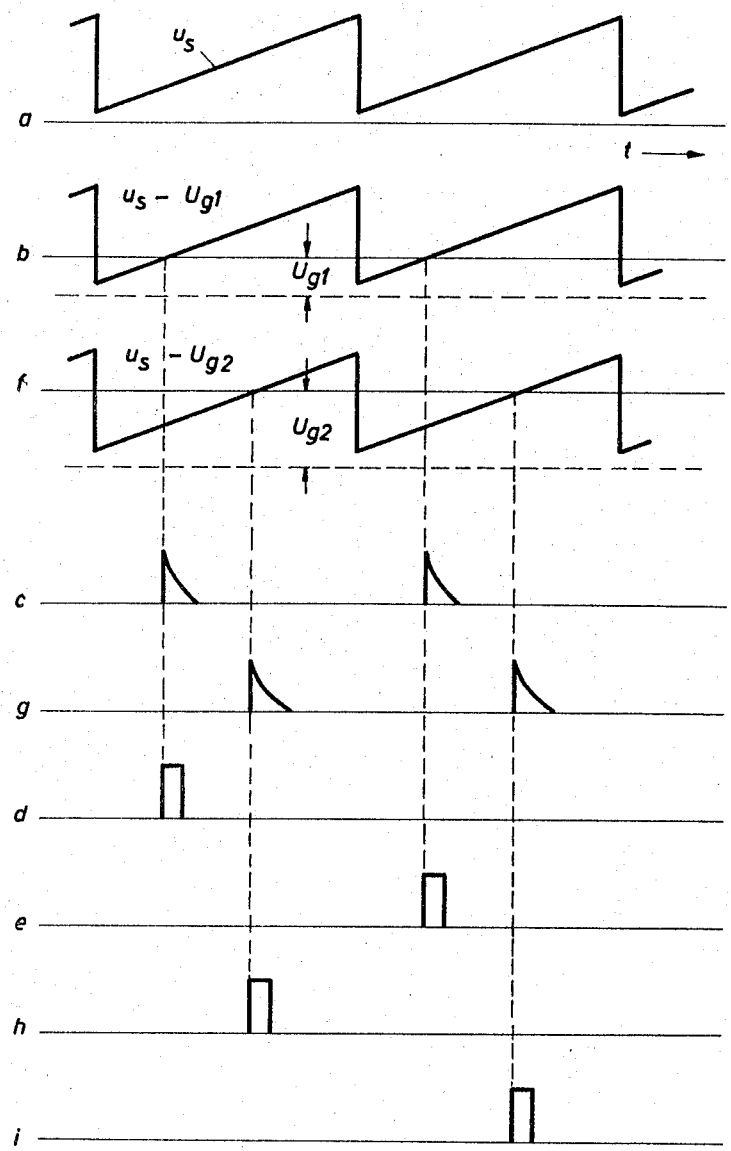
FIG. 4 is a graph showing the various voltage processes involved in operation of the circuit of FIG. 3.

Such a phase displacement does not present any difficulties in the control device according to the invention. A suitable arrangement composed of two of the FIG. 1 control devices is shown in FIG. 3. The voltage curves in this arrangement are shown in FIG. 4. In FIG. 3 the parts of the first control device are designated 3 to 5; those of the second control device by 7 to 9. Common to both is the sawtooth generator 1 with the variable limiting resistance 2. With the sawtooth voltage produced are now connected in series, two difference D.-C. voltages in such a way that the resulting sawtooth voltages $b$ and $f$ produce from the output of pulse shapers 4, 8 the impulse series $c$ and $g$ of a frequency $2f$, but which are dephased by 60°. The two D.-C. voltages are tapped respectively at the potentiometers 3 and 7. From each of these impulse series $c$ and $g$ are obtained by the two frequency dividers 5 and 9 two series of impulse $d$, $e$ and $h$, $i$ of the frequency $f$. The inverters 6 and 10 controlled respectively by these impulses are connected in series on the output side to terminals T.

By changing the mutual phase position of the alternating voltage derived from the two series connected inverters, one can vary, to a great extent, the effective voltage of the resulting output voltage.

Figure 5:
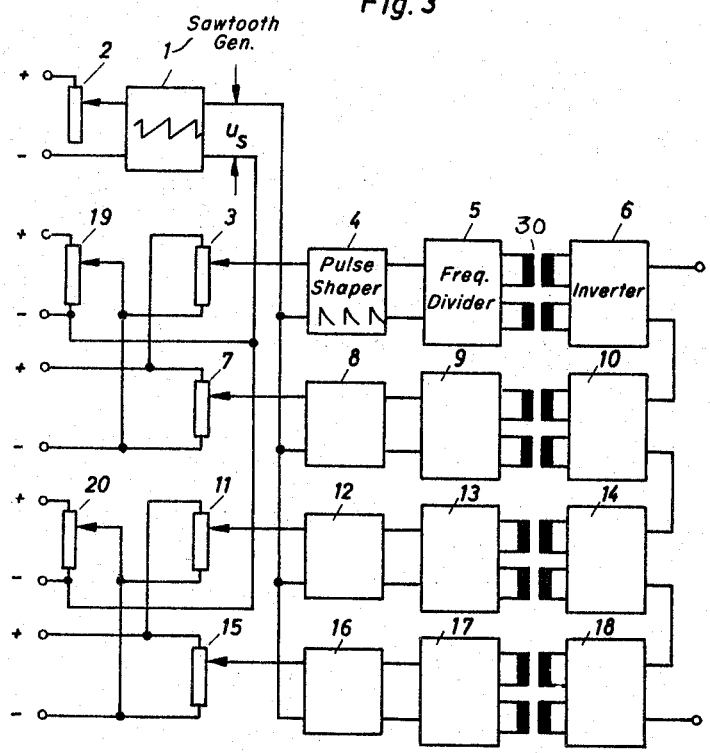
FIG. 5 is also a block schematic of still another embodiment of the invention which comprises several of the two-pulse inverters illustrated in FIG. 1 and which have their outputs connected in series.

A suitable arrangement for doing this is shown in FIG. 5. It consists of two control devices and inverters according to FIG. 3, which are all connected in series on the output side of the inverters. The arrangement consists of a common sawtooth generator 1 with the variable limiting resistance 2, the parts 3 to 5, 7 to 9 as well as 11 to 13 and 15 to 17, belonging to the control devices and the additionally provided potentiometers 19 and 20. The phase position of the first two and of the last two control devices can be so divided, each for itself, by the potentiometers 3, 7 and 11, 15, that the output voltages of the respective inverter groups 6, 10 and 14, 18 show a phase displacement of 60° and thus no longer contain a third harmonic. The mutual phase position of the total voltages of the two inverter groups can be adjusted by the potentiometers 19 and 20. If the phase displacement of the two control voltages is changed gradually from $180°-60°=120°$, the total voltage of all four inverters decreases continuously from the double voltage value of one inverter group to a low voltage value.

Instead of the D.-C. voltages of the potentiometers 19 and 20, which are assumed to be adjusted by hand, one can also use voltages which are tapped from a regulating device. It is possible, for example, to tap these voltages from a push-pull amplifier so that, depending on the control of the amplifier, the variation of one output voltage of the amplifier entrains an opposite variation of the other output voltage.

The embodiment of a sawtooth generator 1, shown in FIG. 6 consists, as already mentioned, of a condenser 21, which is charged over the variable limiting resistance 2 by a D.-C. voltage source represented symbolically, the time constant of this charging process being adjustable by the resistance. After a certain time the voltage of the condenser should have attained a value which has the result that a voltage-dependent flip-flop circuit 22, which can again consist in the manner of a Schmitt trigger of an arrangement of two transistors, is brought into a different switching state. Here an additional transistor 23, whose emitter-collector-section is connected over a discharge resistance 24 with the condenser 21, receives a base voltage which makes the transistor conductive. This effects the quick discharge of the condenser. After the condenser is discharged, the circuit 22 flips into its original switching state, so that a new charge of the condenser can start, while the transistor 23, whose base remains on the condenser 25 for a certain time at its present voltage value, is temporarily blocked.

The frequency divider 5 with the division ratio 1:2 is represented by way of an example by a known arrangement according to FIG. 7. The arrangement consisting of two transistors 26 and 27 is basically a bistable flip-flop circuit with one input E and two outputs $A_1$ and $A_2$. With each newly arriving signal, the circuit flips into the other state, so that the output signal appears at one time at $A_1$ and the next time at $A_2$ and vice versa. As it is known from counting circuits, the represented circuit can be logically extended to a greater number of counting stages.

I claim:

1. In a control device for self-guided inverters with a pulse number $p$ for the production of $m$ number of A.C. voltages having a frequency $f$ from a source of direct current and wherein $p/m=1, 2 \ldots$, the combination comprising a voltage generator producing a sawtooth voltage wave at a frequency $p \cdot f$, circuit means combining said sawtooth voltage wave in series opposition with a D.C. voltage to produce a second sawtooth voltage wave at the same frequency $p \cdot f$ and having a zero passage point, a pulse shaper fed by said second sawtooth voltage wave and producing at its output a shaped pulse at each zero passage point in said second sawtooth voltage wave, a frequency divider fed from the pulse output of said pulse shaper, said frequency divider having a $p$ number of outputs and a division ratio of 1:$p$ and producing at said outputs $p$ number of symmetrically dephased impulse series of a frequency $f$, means transforming the outputs from said frequency divider into potential separated control impulses and means applying said control impulses to the valves of the inverter.

2. The invention as defined in claim 1 as applied to a group of two-pulse inverters whose voltage outputs are connected in series and where there is a 60° mutual phase displacement of the A.C. voltages to eliminate the respective third harmonics thereof, there being two pulse shapers and two frequency dividers correlated to a common sawtooth generator, the D.C. voltages connected in series opposition with the output voltage from said sawtooth generator having such values that the control impulses emitted by said frequency dividers to the corresponding inverters show a mutual phase displacement of 60°.

3. The invention as defined in claim 2 as applied to two groups of two-pulse inverters wherein the outputs from said inverters are connected in series, the series connected output voltages of each said group having a mutual invariable phase displacement of 60° to suppress the third harmonic of the A.C. voltages produced by said inverters, while the phase displacement of the output voltages of the two inverter groups is variable between 0 and 120° to vary the effective value of the resulting total A.C. voltage, said D.C. voltages being so varied in a mutually dependent manner that the differences between the D.C. voltages fed to the pulse shapers of each group remains constant while the difference between the resulting D.C. voltages of the groups is variable.

No references cited.

JOHN F. COUCH, *Primary Examiner.*

G. GOLDBERG, *Assistant Examiner.*